(12) United States Patent
Schneider et al.

(10) Patent No.: US 8,950,548 B2
(45) Date of Patent: Feb. 10, 2015

(54) BROADBAND SOUND ABSORBER

(75) Inventors: Marco Schneider, Essen (DE); Dirk Jaeger, Dortmund (DE); Volker Kursch, Essen (DE); Edmund Sumann, Witten (DE); Norbert Nicolai, Schernbeck-Gahlen (DE); Volkmar Schulze, Schierling (DE)

(73) Assignee: HP Pelzer Holding GmbH, Witten (DE)

( * ) Notice: Subject to any disclaimer, the term of this patent is extended or adjusted under 35 U.S.C. 154(b) by 0 days.

(21) Appl. No.: 13/818,521

(22) PCT Filed: Jan. 28, 2011

(86) PCT No.: PCT/EP2011/051240
§ 371 (c)(1),
(2), (4) Date: Mar. 6, 2013

(87) PCT Pub. No.: WO2012/025253
PCT Pub. Date: Mar. 1, 2012

(65) Prior Publication Data
US 2013/0153331 A1    Jun. 20, 2013

(30) Foreign Application Priority Data
Aug. 25, 2010  (DE) .......................... 10 2010 035 431

(51) Int. Cl.
| | | |
|---|---|---|
| *E04B 1/84* | (2006.01) | |
| *E04B 1/82* | (2006.01) | |
| *B60R 13/08* | (2006.01) | |
| *G10K 11/162* | (2006.01) | |
| *E04B 1/74* | (2006.01) | |

(52) U.S. Cl.
CPC ........... *E04B 1/8409* (2013.01); *B60R 13/0815* (2013.01); *G10K 11/162* (2013.01)
USPC .......................................... 181/292; 181/286

(58) Field of Classification Search
USPC .......... 181/292, 293, 286, 290, 284; 296/39.3
See application file for complete search history.

(56) References Cited

U.S. PATENT DOCUMENTS

| | | | |
|---|---|---|---|
| 3,265,154 A | | 8/1966 | March |
| 4,463,049 A | * | 7/1984 | Kracke .......................... 442/120 |
| 4,705,139 A | * | 11/1987 | Gahlau et al. ................. 181/290 |
| 4,800,984 A | * | 1/1989 | Kerman ........................ 181/290 |
| 6,145,617 A | | 11/2000 | Alts |
| 6,820,720 B1 | * | 11/2004 | Nicolai et al. ................. 181/292 |
| 6,971,475 B2 | * | 12/2005 | Tompson et al. ............. 181/204 |
| 7,070,848 B2 | * | 7/2006 | Campbell ...................... 428/137 |

(Continued)

FOREIGN PATENT DOCUMENTS

| | | |
|---|---|---|
| AT | 010338 U1 | 1/2009 |
| DE | 3448259 C2 | 9/1985 |

(Continued)

*Primary Examiner* — Edgardo San Martin
(74) *Attorney, Agent, or Firm* — Gregory N. Clements; Clements Bernard PLLC (57) ABSTRACT

The invention relates to a broadband sound absorber (1) which comprises a sound-absorbing filler material between two microperforated film webs (2) which are contiguous on their edges, said filler material optionally containing heavy fillers. The broadband sound absorber (1) achieves excellent acoustic insulation and has microperforations (4) all over or only in sections, said filler material optionally containing heavy fillers (mass density) and one or both microperforated film webs (2) having the same thickness across their surface or thickened portions (3, 5) of the same or a different material in some sections.

15 Claims, 5 Drawing Sheets

(56) References Cited

U.S. PATENT DOCUMENTS

| | | | | |
|---|---|---|---|---|
| 7,712,579 | B2 * | 5/2010 | Ueno | 181/286 |
| 8,158,246 | B2 * | 4/2012 | Inoue et al. | 428/304.4 |
| 8,256,572 | B2 * | 9/2012 | Castagnetti et al. | 181/290 |
| 8,276,710 | B2 * | 10/2012 | Soltau et al. | 181/294 |
| 8,499,887 | B2 * | 8/2013 | Gleine et al. | 181/292 |
| 2006/0118355 | A1 | 6/2006 | Bloemeling et al. | |
| 2007/0287001 | A1 * | 12/2007 | Carlson et al. | 428/304.4 |
| 2008/0067002 | A1 * | 3/2008 | Pfaffelhuber et al. | 181/290 |
| 2010/0108438 | A1 * | 5/2010 | Duffy | 181/290 |
| 2012/0255809 | A1 * | 10/2012 | Inoue et al. | 181/290 |
| 2013/0264147 | A1 * | 10/2013 | Sugimoto et al. | 181/292 |

FOREIGN PATENT DOCUMENTS

| | | |
|---|---|---|
| DE | 3637334 C2 | 5/1988 |
| DE | 4222904 A1 | 1/1994 |
| DE | 29501501 U1 | 12/1995 |
| DE | 19633839 C2 | 2/1998 |
| DE | 19730922 A1 | 1/1999 |
| DE | 29623602 U1 | 1/1999 |
| DE | 19849366 A1 | 4/2000 |
| DE | 19909046 A1 | 9/2000 |
| DE | 29915428 U1 | 10/2000 |
| DE | 29915429 U1 | 10/2000 |
| DE | 19920969 B4 | 11/2000 |
| DE | 19932175 A1 | 1/2001 |
| DE | 10022902 A1 | 3/2001 |
| DE | 10237366 A1 | 2/2004 |
| DE | 69820676 T2 | 6/2004 |
| DE | 10311421 A1 | 9/2004 |
| DE | 10324257 B3 | 9/2004 |
| DE | 202004008165 U1 | 11/2005 |
| DE | 202004009726 U1 | 12/2005 |
| DE | 102004037767 A1 | 2/2006 |
| DE | 102004052328 A1 | 5/2006 |
| DE | 102004053751 A1 | 5/2006 |
| DE | 102005041707 A1 | 5/2006 |
| DE | 102004054646 A1 | 6/2006 |
| DE | 102007020832 A1 | 11/2008 |
| DE | 102007036952 A1 | 2/2009 |
| DE | 102008017357 A1 | 10/2009 |
| EP | 0439432 A1 | 7/1991 |
| EP | 0751044 B1 | 1/1997 |
| EP | 0909680 A1 | 4/1999 |
| EP | 0934180 B2 | 8/1999 |
| EP | 1062124 B1 | 12/2000 |
| EP | 1161360 B1 | 12/2001 |
| EP | 1182087 A2 | 2/2002 |
| EP | 1188547 A1 | 3/2002 |
| EP | 1296832 B1 | 4/2003 |
| WO | 98/18656 A1 | 5/1998 |
| WO | 99/44817 A1 | 9/1999 |
| WO | 99/46147 A1 | 9/1999 |
| WO | 03/057465 A1 | 7/2003 |

* cited by examiner

BROADBAND SOUND ABSORBER

FIELD OF THE INVENTION

The invention relates to a broadband sound absorber comprising a sound-absorbing filler material, which optionally contains a heavy filler, between two microperforated sheets in complete mutual circumferential contact.

BACKGROUND OF THE INVENTION

A low sound level in the interior of a vehicle contributes to a relaxed driving experience and thus to an increased passive safety of a motor vehicle. The basic physical principles of absorption and insulation are known for reducing airborne sound. An optimum solution, which may be different for each individual application, is the coupling of the two systems.

Suitable combinations of materials are used, for example, for vehicle carpets/floor paneling systems, bulkhead modules or in the roof liner, and essentially contribute to the reduction of the background noise in the interior of the vehicle.

Component parts that cause insulation have a closed structure, i.e., they have no transmission of sound or air; they are most effective in a mass-spring structure. In addition to a flexible heavy layer, such a system also comprises an elastic and soft absorptive underlayer. The elastic layer causes a partial vibration decoupling of the individual elements and thus a reduction of the background noise. The insulation is determined by the mass of the heavy layer and by the spring stiffness of an absorptive layer.

However, a good sound absorption is necessary not only in vehicle construction. It is also important in aerospace technology, in rail transport, in the production of domestic appliances, or in house construction. A sound absorber for such applications must be optimized in such a way that sound is absorbed in a particular frequency range, which varies depending on the application, by appropriately selected materials.

In the prior art, sound absorbers made of fibrous materials, which are employed in a bonded form, for example, as nonwovens, are known, especially from the motor vehicle field.

Polymers, inorganic or metallic fibers in addition to natural fibers are employed as the fibers. Thus, EP 1 182 087 A2 describes an absorber comprising cellulose fibers and a synthetic resin. EP 0 909 680 A1 employs polyester fibers as sound absorbers. The diameter, thickness and drag of the fibers employed determine the efficiency and the frequency range in which the sound is absorbed.

DE 20 2004 009 726 U1 comprises a sound-absorbing self-supporting bulkhead cladding for motor vehicles for shielding the passenger compartment towards the engine compartment, comprising a sound absorber formed from a non-woven material pressed at least in portions thereof, characterized by being provided with a plastic frame formed by back injection or back molding on the pressed non-woven material and having at least one integrated fastening means.

The same or similar component parts made of foams, preferably PUR or melamine, with different densities instead of fibrous materials are also known.

The structure described as a spring-mass is known from the literature with different materials for the heavy layer (PUR, PE/EVA, EPDM and generally TPO based heavy layers), which are deep-drawn as a sheet, foamed, injection molded, sprayed, non-woven-laminated, or back foamed.

A lightweight sound-insulating cladding for a body part of a motor vehicle and a process for the production thereof are described in DE 10 2007 020 832 A1. The cladding, which is described, in particular, in the form of a lightweight bulkhead cladding, comprises a sound absorber layer, an essentially airtight sound insulation layer directly bonded to said sound absorber layer, and an adjacent foam layer, said sound absorber layer being formed from a porous absorber, preferably a non-woven or foam. The sound insulation layer consists of an integral skin layer of the foam layer having a thickness of at least 0.5 mm, which is bonded with the porous absorber by an integral joint, namely by back foaming the porous absorber, essentially without foam penetration.

A vehicle interior part made of a plastic material that also has a sound insulation is known from DE 34 48 259 C2. The plastic interior part includes polyolefin and/or polystyrene, synthetic rubber, and a filler.

If a foam is used as the sound absorber, preformed component parts are often prepared in this case too. These parts are optimized in terms of composition to exhibit the frequency-related sound absorption required for the corresponding position in the vehicle.

DE 20 2004 008 165 U1 describes a sound-insulating component part made of a highly filled thermoplastic elastomer based on styrene. The sound-insulating component part is suitable, in particular, for transmission tunnels and/or bulkhead claddings and additionally contains fillers.

A multilayer absorber according to the acoustic spring-mass system is described in DE 199 09 046 A1. The heavy layer serving as the mass is applied in different layer thicknesses and/or with different masses per unit area in situ to the porous soft layer serving as the spring, especially it is sprayed or injected thereto, or laid down through a flat sheet die.

DE 10 2004 054 646 A1 relates to a lightweight sound-insulating cladding for a body part of a motor vehicle, especially in the form of a bulkhead cladding, and to a process for producing such a cladding. The cladding includes a foam-molded sound insulation layer of polyurethane foam and a foam-molded sound-absorbing layer of open-cell polyurethane flexible foam.

A sound insulation part, especially for motor vehicles, comprising at least one sound-absorbing layer and at least one heavy layer bonded with it directly by an integral joint, and processes for producing it are described in DE 10 2005 056 840 B3. In a corresponding sound insulation part, the heavy layer is designed as a microporous sprayed skin to have at least one air-permeable part-surface zone and at least one air-impermeable part-surface zone.

DE 10 2004 037 767 A1 describes a sound insulator for a passenger compartment of a vehicle. In a corresponding sound insulator comprising an air cushion consisting of a damping sleeve made of an elastic material between a sound-emitting component part and the interior compartment, a sound insulating layer adapted to the shape of the component part and acting as a spring-mass system, which is sealed with a heavyweight film that forms a first shell of the air cushion on the side facing the interior compartment, is provided, and a second shell of the air cushion consisting of an elastic, preferably preformed, sheet sealed together with said heavyweight film is provided, wherein an air cushion is provided between said first and second shells.

DE 103 24 257 B3 comprises a sound absorber consisting of two interconnected textile non-woven fabrics with a thermoplastic and/or heat setting bond. The two textile non-woven fabrics have different layer thicknesses and densities to improve sound absorption.

A special form of absorbers are open two-layered absorbers in which the drags and thus the impedance of both layers differ.

In general, this stands for the combination of two layers; non-woven/non-woven, non-woven/foam and foam/foam with different drags are known. The acoustic performance is based on a balance between absorption and insulation, see, for example, DE 103 24 257 B3; EP 0 934 180 B2 (WO 98/18657); WO 98/18656; U.S. Pat. No. 6,145,617; WO 99/44817.

In DE 197 54 107 C1 and the prior art references therein, the absorption behavior of microperforated component parts is examined. What is examined here are baffle structures made from layers of microperforated sheets, pending from a ceiling or a roof as compact absorbers. The microperforated sheets are suitable for absorbing sound waves incident from one or both sides, vertically, obliquely or grazingly from the ambient very efficiently, especially for higher frequencies.

Component parts for use in motor vehicles that, in addition to one or two microperforated sheets, with fibrous or foamy absorbers are provided behind a sheet or between the two sheets are known from the prior art; the following documents may be mentioned by way of example: DE 100 22 902 A1, DE 10 2005 041 707 A1, DE 296 23 602 U1, DE 196 33 839 C2, EP 0 751 044 B1, EP 0 439 432 A1, EP 1 062 124 B1, WO 99/46147, EP 1 188 547 A1, DE 198 49 366 A1, DE 199 32 175 A1, DE 199 20 969 B4, DE 199 20 969 A1, EP 1 161 360 B1, WO 00/68039, DE 299 15 428 U1, DE 299 15 429 U1.

The use of a non-woven layer for sound insulation is further known from DE 10 2007 036 952 A1. The sound insulation described here comprises a foam layer and a barrier layer (absorption mat), which is characterized in that an optionally microperforated non-woven layer, a microperforated film, or a microperforated non-woven film is located partially or fully between the foam layer and the barrier layer.

A sound absorber may also have a foam layer instead of a non-woven layer. This is described, for example, in DE 100 22 902 A1. The covering element or molded element for means of transport as described herein comprises at least one microperforated film absorber, at least one foam and/or non-woven absorber and/or a clearance at a distance to a reverberant wall.

These component parts can be optimized for the corresponding frequency in terms of maximum absorption.

Absorbers are known to have a low insulation when the absorption is correspondingly high. A low absorption is found, in particular, in the technically interesting frequency range of from 500 to 2500 Hz. The absorption is reduced to the extent that the insulation is increased by applying the mass.

This often involves the need for an additional mold for molding the additional mass, which of course adds to the cost for the component part.

Almost all components are true-contoured with respect to the car body and thus cause high cost for the mold.

SUMMARY OF THE INVENTION

The object of the present invention is to provide a sound absorber that avoids the above mentioned disadvantages of the prior art.

Thus, the frequency at which the absorber exhibits its maximum absorption should be adjustable.

Without essential losses of absorption, an insulation that almost reaches the extent of spring-mass systems is to be achieved.

As compared to conventional systems, the absorber according to the invention should have a low weight and a very low production cost, be recyclable, and comprise recycling material itself.

The object of the present invention is achieved by a broadband sound absorber 1 with a high acoustic insulation, comprising a sound-absorbing filler material, which optionally contains a heavy filler (mass component), between two sheets 2 in complete circumferential contact having a complete or area-dependent microperforation 4, wherein one or both sheets 2 have the same thickness throughout their area or partial swellings (3, 5) consisting of a material which is the same as or different from that of the sheet 2.

The drawings are to aid in the illustration and understanding of the invention. In this regard, they are not intended to limit the invention.

DESCRIPTION OF THE PREFERRED EMBODIMENTS

The present invention is direct to a broadband sound absorber (1) with a high acoustic insulation, comprising a sound-absorbing filler material 6 between two sheets (2) in complete circumferential contact having a complete or area-dependent microperforation (4), wherein one or both microperforated sheets (2) have the same thickness throughout their area or partial swellings (3, 5) consisting of a material which is the same as or different from that of the sheet (2); and optionally contains a heavy filler 7 (mass component).

A sound absorber 1 is "broadband" within the meaning of the present invention if the absorption is high in the frequency range of 400 to 10,000 Hz if possible.

By adjusting the microperforated sheet 2 to the filler material, a frequency-tuned absorption is achieved. In addition to the selection of a suitable sheet 2 and of the controlled microperforation 4 thereof, the selection of the filler material 6 and of the heavy filler 7 is also critical to the quality of sound absorber 1. The frequency of the sound absorber 1 obtained can be adapted to the existing conditions by appropriately combining the individual components.

A high acoustic insulation within the meaning of the present invention means an insulation that is increased over that of the usual filler material, which is in a pressed form, over a broad frequency range.

The microperforated sheets are in complete circumferential contact to form a cavity. This cavity is filled with a filler material 6, which serves as a spacer between the two sheets 2, or preferably has a sound-absorbing effect. Suitable filler materials include all materials that produce a distance between the sheets and additionally, if possible, are sound-absorbing, especially fibers, foam flakes, feathers, hollow bodies, expanded polymers, wood shavings, or wood flour.

Both natural and synthetic fibers are employed as said fibers. In addition to plastic fibers, plant, animal or inorganic fibers may also be used. Flakes of polyurethane foam, polyester foam and/or polyolefin foam, for example, can be used for filling the cavity between the sheets 2. Hollow bodies selected from polyolefin or glass are suitable as fillers, as are wood shavings or wood flour, where the latter can be employed in a loose form or shaped as a board. EPS (expanded polystyrene), EPP (expanded polypropylene), or PEPP (porous expanded polypropylene) are also suitable as fillers. The above mentioned filler materials 6 can be employed as individual materials and/or blends, where blends of two or more materials can be used.

The filler material may have different thicknesses, weights, compositions and/or densities over the area of sound absorber 1. The sound absorber 1 according to the invention can be optimized in terms of its effect by selectively introducing defined amounts of the filler in individual positions. It is also possible to selectively place different filler materials at particular areas, especially in large-area or large-volume sound absorbers, so that an improved sound absorption is achieved. "Area" within the meaning of the present application is to be understood herein not only in the sense of a two-dimensional extent. It is also possible that the composition of the filler material varies in all three directions of space in terms of thickness, weights and/or density.

In addition to the sound-absorbing filler material 6, the sound absorber 1 may optionally also comprise a heavy filler 7. According to the invention, such a heavy filler 7 contains highly filled thermoplastic or thermoset plastic materials selected from PE (polyethylene), PP (polypropylene), EVA (ethylene-vinyl acetate), and/or copolymers thereof alone or in admixture, filled with mineral particles selected from chalk, baryte, sedimentary rock, silicates, and/or magnetite. A corresponding heavy filler serves as a mass component of a spring-mass system.

The mass component of the filler material 6 may have different weights over the area. This is another fact that enables the use of the heavy fillers 7 according to need. In particularly sound-exposed positions, a higher weight may be necessary and should also be introduced in the corresponding positions according to the invention. All in all, this leads to a saving of the necessary heavy filler and thus to a reduction of the production cost. In this case too, "area" within the meaning of the present application is to be understood not only as a two-dimensional extent. It is also possible that the mass per unit area of the filler material varies in all three directions of space.

A sound absorber 1 according to the invention has a low total weight, because the mass per unit area can be selectively increased in the necessary places. Regions in which the mass per unit area can be kept lower will also have a lower mass per unit area of the filler. Because of its lower weight, the sound absorber can be more easily handled during the mounting thereof, on the one hand, and the total weight of the correspondingly sound-proofed motor vehicle is kept low and thus its energy consumption is lowered, on the other.

By selectively introducing and positioning the filler and mass component, the corresponding raw materials can be saved. Thus, the production cost can be kept low without affecting the quality of sound insulation.

In a sound absorber 1 according to the invention, the mass per unit area of the sound-absorbing filler material 6 is from 0.2 kg/m$^2$ to 8 kg/m$^2$, especially from 0.5 kg/m$^2$ to 3 kg/m$^2$. It has been found that such a mass per unit area of the sound-absorbing filler material ensures a sufficient sound absorption; at the same time, the weight can be kept low. If the mass per unit area of the filler material is below 0.2 kg/m$^2$, a sufficient sound insulation cannot be ensured. However, if the mass per unit area of the filler material exceeds 8 kg/m$^2$, the total weight of the absorber becomes high without an improvement of the absorption performance. Particularly good results are achieved with a mass per unit area within a range of from 0.5 kg/m$^2$ to 3 kg/m$^2$. In this range, a very good sound absorption is achieved with a simultaneously low weight of the sound absorber.

Figure 1:
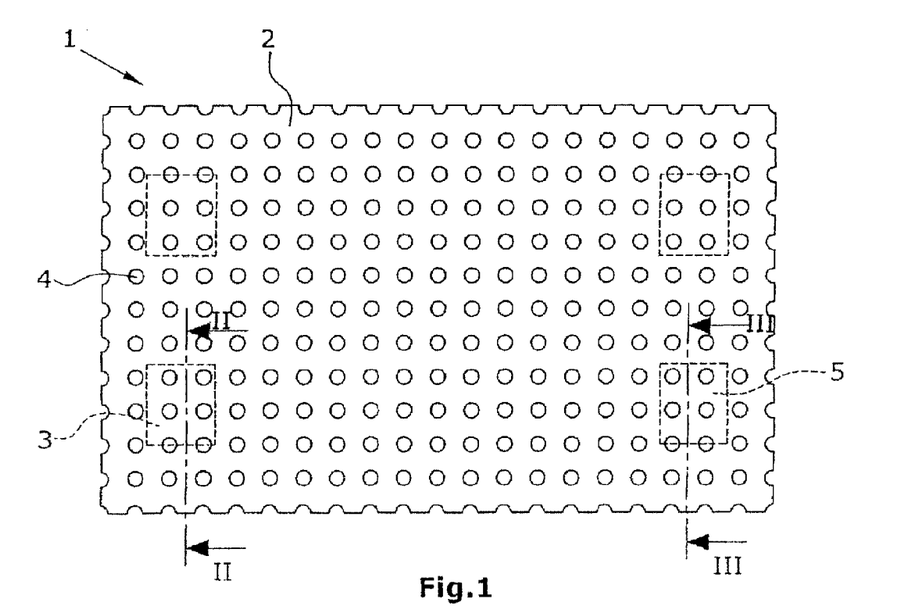
FIG. 1 is a front view of the broadband sound absorber.
Figure 2:
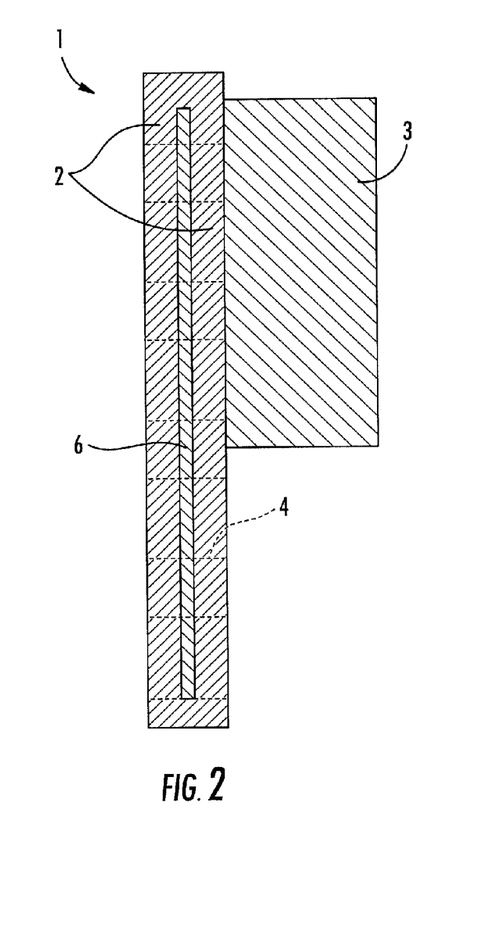
FIG. 2 is a cutaway side view of the broadband sound absorber.
Figure 3:
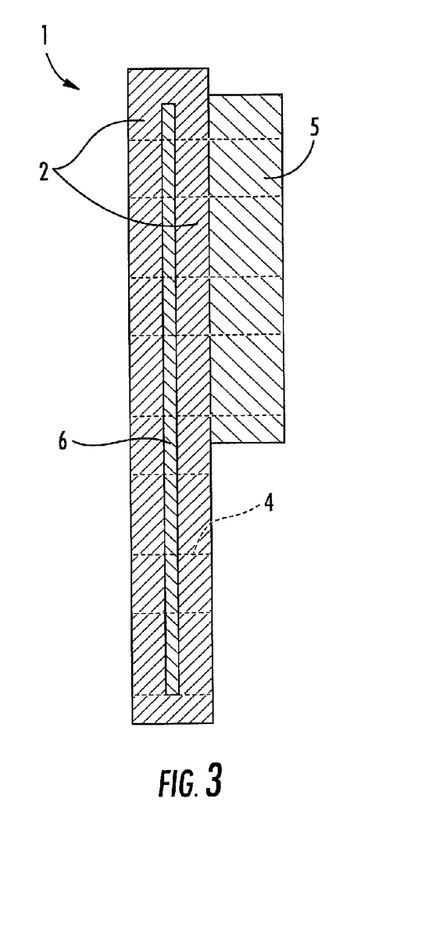
FIG. 3 is a cutaway side view of a modified broadband sound absorber.

The microperforated sheets 2 influence the drag by defined perforations. One or both microperforated sheets 2 can have the same thickness throughout the area. Thus, a homogeneous flow and sound absorption over the entire area is achieved. However, in order to adapt the sound absorber according to the invention to particular conditions, it is possible for the sheets 2 to have partial swellings 3, 5 as shown in FIGS. 1 to 3. These can be made of a material that is the same as or different from the sheet material. Such swellings 3, 5 are preferably found in places where an increased level of sound occurs and thus an increased sound insulation is necessary. The swellings 3 of FIG. 2 consist of a non-perforated material, especially one having the same chemical composition as the sheet 2. In this case too, the thickness of the swellings 3, 5 can be adjusted depending on the situation as shown in the following FIG. 3. One possibility for the preparation of absorbers with swellings is to bond sheet 2 to the swelling with or without an adhesive between.

If the microperforation is performed only after the bonding of sheet 2 and swelling 3, the microperforation 4 is continuous and simple to prepare. Thus, for example, the swellings 3, 5 can be made of the same microperforated material as sheet 2, as shown in FIG. 3.

The two microperforated sheets, which are in complete circumferential contact, may be made of the same material. They may also be made of different materials.

The sheets 2 themselves include one or more plastic materials, one-ply or multiply plastic materials and/or paper, wherein two-ply plastic materials are preferred. In addition, metal foils or metalized films may also be employed.

According to the invention, the sheets 2, which are in complete circumferential contact, have a microperforation 4. In order to utilize the advantages of microperforation 4 as described in the prior art in terms of sound absorption, the microperforation 4 of sheets 2 has one or more diameters within a range of from 0.05 mm to 2.5 mm, especially within a range of from 0.1 mm to 1.8 mm. The total perforation area of sheets 2 is within a range of from 0.1% to 15%, especially from 0.2% to 7%.

If the diameter is below 0.05 mm, the absorption as a function of the percent perforation becomes too low. However, if the diameter of the perforation exceeds a value of 2.5 mm, the advantage of microperforation 4 disappears. In particular, the diameters are within a range of from 0.1 mm to 1.8 mm. In this range, particularly good results in terms of sound absorption are achieved.

Further, it is to be taken care that the total perforation area of sheets 2 does not exceed a value of 15%. For a total perforation area of >15%, the advantage of microperforation disappears. However, the total perforation area must not fall below 0.1%, because for a lower value, the sheet is virtually closed, and absorption becomes too low. Particularly good absorption values are achieved if the total perforation area of the sheets is within a range of from 0.2% to 7%.

Peculiarities in the microperforation 4 are found, in particular, in the places where the sheets have a swelling 3, 5 and/or mass component 3, 5. In these regions, the sheets preferably have no microperforation 4 (for a mere increase of insulation). If a second material is applied to the microperforated sheet 2, it has a perforation 4 (insulation with absorption) with one or more diameters within a range of from more than 2.5 mm to 50 mm, especially from 5 mm to 20 mm.

If the diameter of perforation 4 in the region of the swelling is below 2.5 mm, the coupling of absorber 1 becomes too low, and the total structure has too little an absorptive effect. However, if the diameter of perforation 4 exceeds a value of 50 mm, the swelling 3, 5 loses too much mass depending on the perforation density, and the desired effect (additional insulation) is no longer observed. In particular, the diameters of the perforations in the region of the swelling 3 are within a range of from 5 mm to 20 mm. In this range, particularly good results in terms of sound absorption are achieved.

In the region of the swellings 3, 5 and/or mass component 3, 5, the perforation area is from 0.1 to 30%, especially from 0.2% to 10%.

With respect to the absorption, the total perforation area of sheets 2 in the region of swellings 3, 5 and/or mass components 3, 5 should not exceed a value of 30%. For a total perforation area of >30% in these regions, the insulation effect of swelling 3, 5 becomes negligible. However, the total perforation area must not fall below 0.1%, because the absorption is too much reduced for a lower value. With a total perforation area of sheets 2 in the region of swellings 3, 5 and/or mass components 3, 5 of from 0.2% to 10%, particularly good absorption values are achieved.

Especially with sound absorbers 1 having a large spatial extent, the filler material may become shifted within the absorber. To avoid this, the two sheets 2 are preferably connected by (reinforcing) webs forming compartments and/or partitions outside the peripheral zone. The webs form individual compartments in which the filler material is kept in the required position. Further, the webs serve to reinforce the whole absorber.

To form the sound absorber 1, the two sheets must be in complete circumferential contact. The connecting seam must not come undone even at elevated or lowered temperatures, as may occur during operation. The connection must ensure a secure enclosure of the filler and of the mass component. In order to achieve complete circumferential contact, the sheets 2 may be welded, clamped, adhesive-bonded, buttoned, sewn, stapled, riveted or bonded together in some other way known in the prior art.

A mass distribution according to need is possible by selecting the nature and quantity of the filler and by varying the sheet material 2. Thus, a sound absorber 1 according to the invention can replace any absorbers known from the prior art.

This system can be employed, for example, in the cavities of vehicles as a bulkhead insulation between the dashboard and bulkhead panel, in pillars, behind trim parts, in the engine compartment, or as a roof liner. However, the possible applications are not limited to vehicles. Rather, the possible field of application is variable. An absorber 1 according to the invention can be employed wherever absorbing and insulating systems are required, for example, in the aerospace field, in shipping, in the production of domestic appliances, in plant construction, in construction acoustics, or similar fields.

A sound absorber 1 according to the invention has a flexible structure and thus can be adapted three-dimensionally to existing structures. A deforming process is not required. Further, such a sound absorber 1 can be recycled. The filler material can be reused in the production of a new sound absorber 1. This again reduces the production cost.

A particular enhancement of the effect can be achieved in cavities and in combination with a wall clearance. A corresponding wall clearance is known to influence the sound absorption capacity.

The following Example shows a possibility of producing a sound absorber according to the invention by way of example.

EXAMPLE

Between two commercially available microperforated PE/PA sheets 2 with an effective surface area of 1.2 m$^2$ and the same thickness (100 μm, 240 E/cm$^2$, perforation diameter about 0.14 mm, percent perforation area about 3.4%), recycled cotton/PET mixed fibers (960 g) were uniformly distributed with a mass per unit area of 800 g/m$^2$.

The rectangular sheets were bonded together in complete circumferential contact by ultrasonic welding; the same was done inside the peripheral zone, namely with a seam in the middle between the two short sides and with one seam each at one and two thirds between the long sides.

The welding inside the peripheral zone forms six individual compartments in which the filler material is positioned specifically according to requirements and free from shifting. The welding webs provide the absorber with intrinsic stability.

Figure 4:
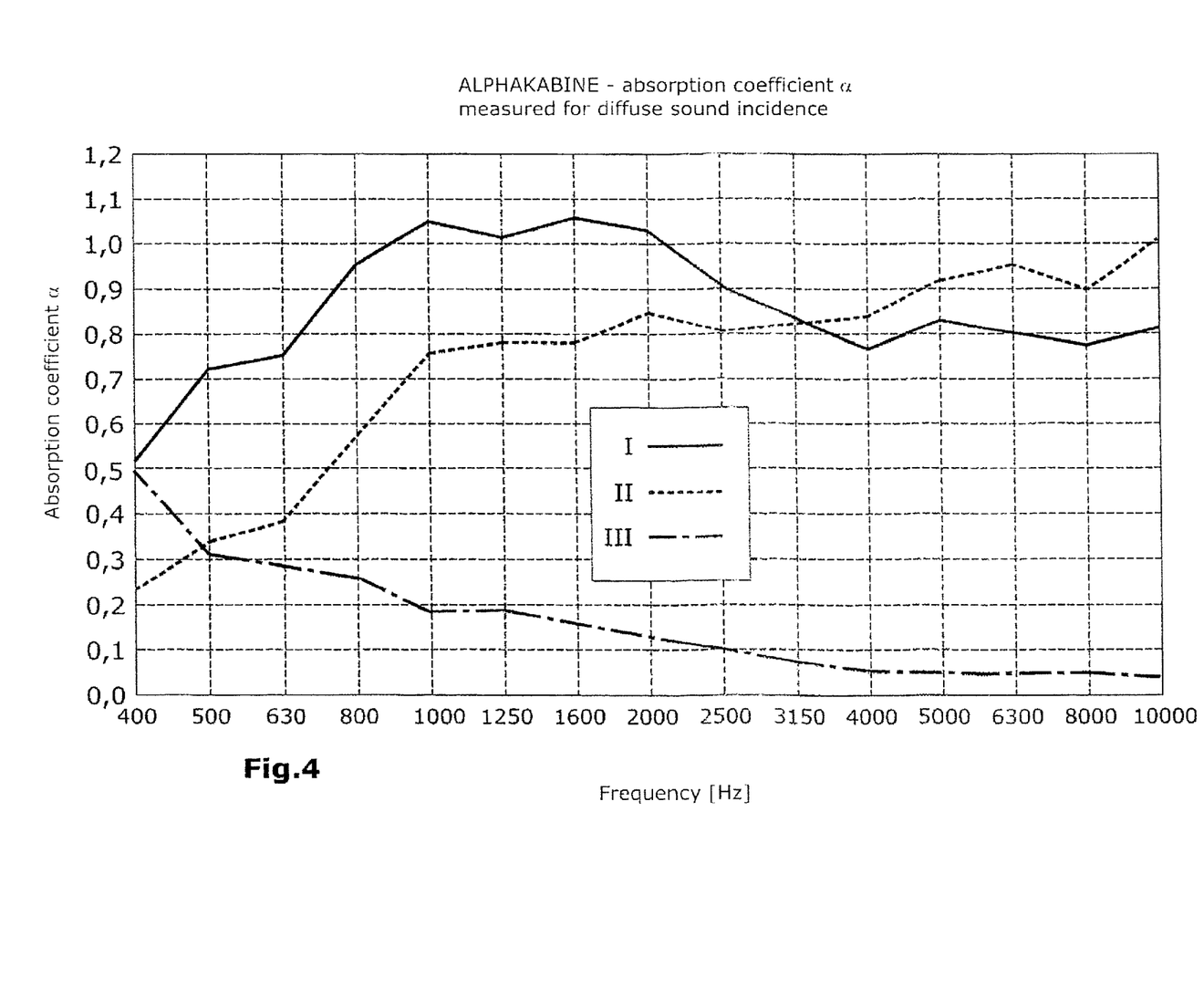
FIG. 4 is a graph of the absorption coefficient versus frequency.
Figure 5:
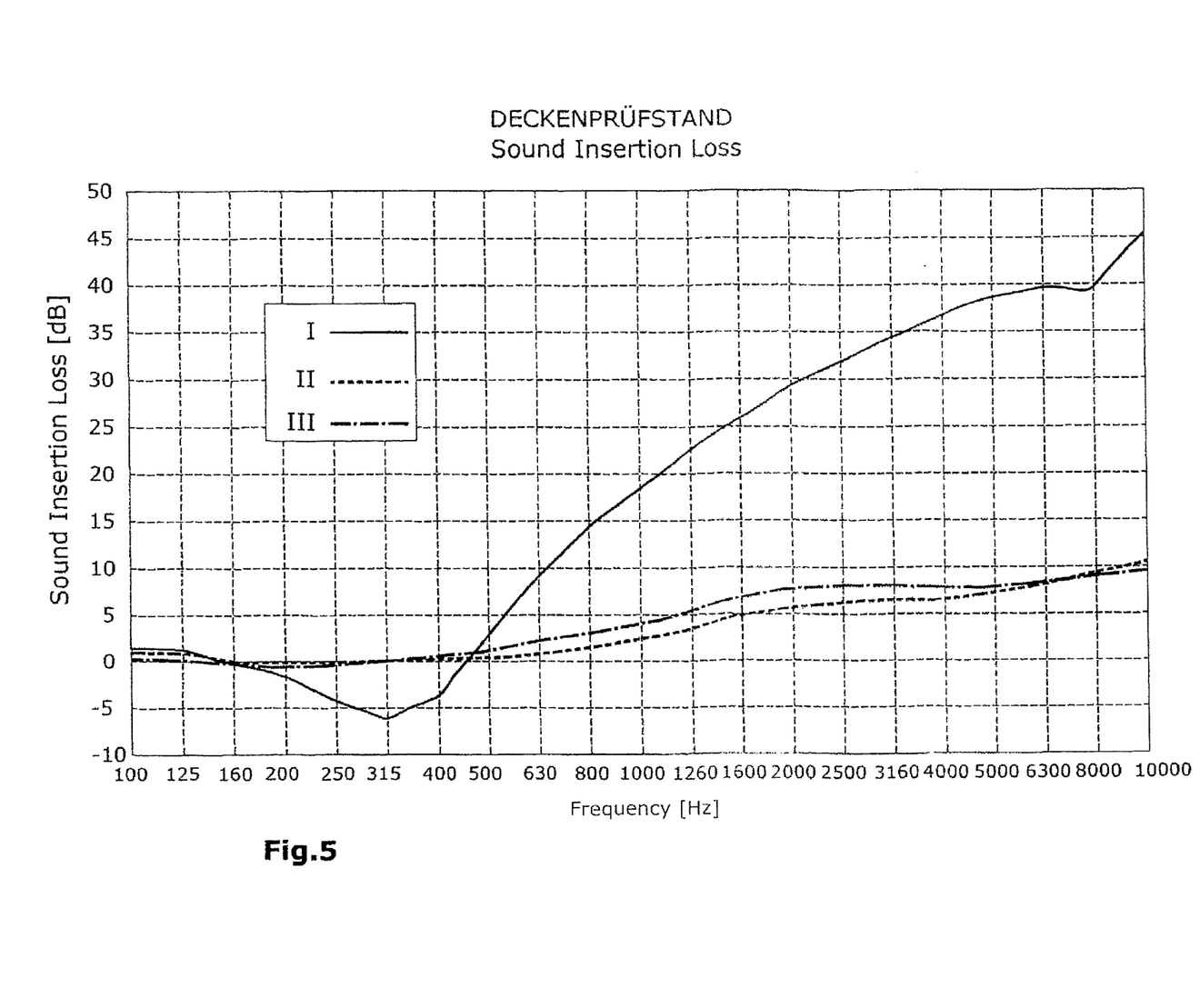
FIG. 5 is a graph of sound loss versus frequency.
Figure 6:
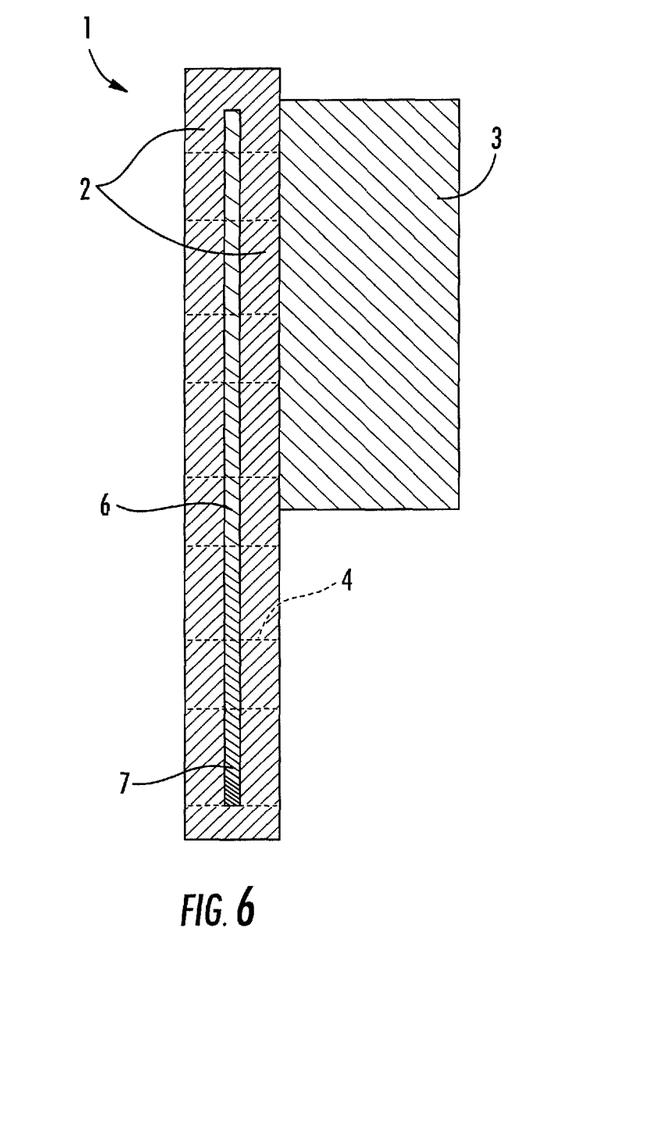
FIG. 6 is a cutaway side view of another broadband sound absorber having heavy filler.

FIGS. 4 and 5 show a comparison between an absorber (I) according to the invention having a filling with a thickness of 20 mm, which corresponds to a component weight of 917 g/m$^2$, and a corresponding absorber (II) of the same material as the filler in a thickness of 18 mm and a mass per unit area of 958 g/m$^2$, and a spring-mass system (III) of the same filler material with a commercially available heavy sheet for a total thickness of 19 mm and a mass per unit area of 2600 g/m$^2$.

The absorption coefficient of absorber 1 according to the invention is significantly superior to that of the comparative absorbers in a range of below 3000 Hz.

The invention claimed is:

1. A broadband sound absorber (1) with a high acoustic insulation, comprising a sound-absorbing filler material, which additionally contains a filler mass component heavier than said sound-absorbing filler material, between two sheets (2) in complete circumferential contact having a complete or area-dependent microperforation (4), wherein one or both microperforated sheets (2) have the same thickness throughout their area or thickened portions (3, 5) consisting of a material which is the same as or different from that of the sheet (2).

2. The absorber (1) according to claim 1, characterized in that said filler material comprises fibers selected from plastic fibers; plant fibers; animal fibers; inorganic fibers; foam flakes selected from polyurethane foam flakes, polyester foam flakes and/or polyolefin foam flakes; feathers; hollow bodies selected from polyolefin, glass; EPS, EPP, PEPP; wood shavings; wood flour in a loose form or shaped as a board, as individual materials or blends of two or more of the materials.

3. The absorber (1) according to claim 1, characterized in that said filler material has different compositions, different thicknesses, weights or densities.

4. The absorber (1) according to claim 1, characterized in that said heavy filler contains highly filled thermoplastic or thermoset plastic materials selected from PE, PP, EVA, or copolymers thereof as well as PUR and EP resins alone or in admixture, filled with mineral particles selected from chalk, baryte, sedimentary rock, silicates, and/or magnetite.

5. The absorber (1) according to claim 1, characterized in that the mass component of the filler material has different weights.

6. The absorber (1) according to claim 1, characterized in that the mass per unit area of the sound-absorbing filler material is from 0.2 kg/m$^2$ to 8 kg/m$^2$.

7. The absorber (1) according to claim 1, characterized in that said sheets (2) include one or more plastic materials, one-ply or multiply plastic materials, metal, metalized plastic films, ceramics, or paper.

8. The absorber (1) according to claim 1, characterized in that the two sheets (2) are made of the same or different materials.

9. The absorber (1) according to claim 1, characterized in that the microperforations (4) of the sheets (2) have one or more diameters within a range of from 0.05 mm to 2.5 mm.

10. The absorber (1) according to claim 1, characterized in that the perforation area of the sheets is from 0.1% to 15%.

11. The absorber (1) according to claim 1, characterized in that said sheets (2) have the same microperforation as in the sheet or no microperforation in the thickened portions.

12. The absorber (1) according to claim 1, characterized in that said thickened portions (3, 5) have a perforation (4) with one or more diameters within a range of from more than 2.5 mm to 50 mm.

13. The absorber (1) according to claim 1, characterized in that the perforation area in the thickened portions (3, 5) is from 0.1 to 30%.

14. The absorber (1) according to claim 1, characterized in that said complete circumferential bonding between the two sheets (2) is achieved by is achieved by welding, clamping, adhesive bonding, buttoning, sewing, stapling or riveting.

15. The absorber (1) according to claim 1, characterized in that the two sheets (2) are partially bonded together inside the peripheral zone by welding, adhesive bonding, clamping, buttoning, sewing, stapling or riveting.

\* \* \* \* \*